(12) United States Patent
Novak et al.

(10) Patent No.: US 6,485,549 B1
(45) Date of Patent: Nov. 26, 2002

(54) SELF PRIMING HIGH PERFORMANCE ENVIRONMENTALLY COMPATIBLE PROTECTIVE COATING

(75) Inventors: Howard L. Novak, Indialantic, FL (US); James M. Klotz, Quakertown, PA (US)

(73) Assignee: USBI, Kennedy Space Center, FL (US)

( * ) Notice: Subject to any disclaimer, the term of this patent is extended or adjusted under 35 U.S.C. 154(b) by 74 days.

(21) Appl. No.: 09/630,995

(22) Filed: Aug. 2, 2000

Related U.S. Application Data

(63) Continuation-in-part of application No. 09/218,867, filed on Dec. 22, 1998, now abandoned.

(51) Int. Cl.[7] ............................................... C08L 29/02
(52) U.S. Cl. ............................... 106/14.44; 106/14.41; 106/14.42; 427/387; 427/388.2; 427/393.5; 524/414; 524/443
(58) Field of Search ........................... 106/14.41, 14.42, 106/14.44; 427/387, 388.2, 393.5; 524/414, 443

(56) References Cited

U.S. PATENT DOCUMENTS

| | | | | |
|---|---|---|---|---|
| 4,885,324 A | * | 12/1989 | Hegedus et al. | 524/204 |
| 5,043,373 A | * | 8/1991 | Hegedus et al. | 524/204 |
| 5,124,385 A | * | 6/1992 | Hegedus et al. | 524/204 |
| 5,236,983 A | * | 8/1993 | Hegedus et al. | 524/204 |
| 5,290,839 A | * | 3/1994 | Hegedus et al. | 427/385.5 |
| 5,290,840 A | * | 3/1994 | Hegedus et al. | 427/385.5 |
| 5,403,880 A | * | 4/1995 | Hegedus et al. | 427/385.5 |

* cited by examiner

*Primary Examiner*—Anthony J. Green
(74) *Attorney, Agent, or Firm*—Norman Friedland

(57) ABSTRACT

A corrosion resistant coating to protect metallic and polymeric composite surfaces from corrosion and water promoted deterioration that is environmentally safe and non-toxic and is applied in one coat without the use of a primer is provided. The coating comprises a tough, flexible polyurethane binder and a corrosion inhibiting pigment selected from the group consisting of zinc hydroxy phosphite, zinc phosphate, calcium ion-exchanged silica, calcium strontium zinc phosphosilicate. The coating is effective in protecting both aluminum and steel surfaces against corrosion in salt spray environments and in protecting polymeric composite materials such as ablative coatings used in aerospace against deterioration after exposure to water.

18 Claims, No Drawings

SELF PRIMING HIGH PERFORMANCE ENVIRONMENTALLY COMPATIBLE PROTECTIVE COATING

This is a continuation-in-part of application Ser. No. 09/218,867, filed Dec. 22, 1998, now abandoned.

BACKGROUND OF THE INVENTION

This invention deals with environmentally safe, non-toxic, protective coatings to provide corrosion resistance to metallic surfaces that are subjected to corrosive environmental conditions and/or thermal stress.

Painting of aluminum and steel structures in the aerospace/seacoast environment requires the use of separate primers and topcoat primers containing toxic and environmentally hazardous lead and chromium compounds. Such coatings often contain high levels of volatile organic compounds which may also be detrimental to the environment and human health. Application of two different coatings, primer and topcoat is labor intensive and also requires inventorying two types of materials thereby increasing the cost of using such coatings. Inspection and measurement of each coating further increases labor costs and is prone to error. Although existing single coat primer-topcoat paints provide some degree of remedy for some of these problems they also have extremely short pot life making them difficult to work with and do not have the level of corrosion inhibitive properties to satisfy launch vehicle requirements.

There is, therefore, a need for an environmentally safe, non-toxic, coating composition to protect aluminum and steel structures and machinery, such as those used in aerospace as well as other industries, from corrosion produced by exposure to environments such as the seacoast. Such a composition should be safe and efficient to use and require only one coat to provide effective corrosion protection. In addition, the coating composition should be substantially free of environmentally hazardous and toxic substances such as lead and chromium compounds and volatile organic compounds. A further requirement for such a coating is that it should have a long pot life to enable efficient use without an undue waste of material. Furthermore, should the coating become damaged, it should be easy to repair in an inexpensive, safe and convenient manner.

BRIEF DESCRIPTION OF THE INVENTION

The present invention is directed to meeting the foregoing needs by providing a two part resin composition comprising a combination of resins containing non-toxic corrosion inhibiting pigments and low levels of volatile organic compounds. The coating composition has a pot life of about three to about four hours and excellent solvent resistance. The coating composition is applied as a single coat without the need of a primer coat and provides excellent corrosion protection to aluminum and steel substrates when exposed to salt spray. The first part or part A of the coating composition comprises saturated polyester polyols having an equivalent weight of about 100 to an equivalent weight of about 2500. The second part or part B of the coating composition comprises a polyisocyanate composition with the polyisocyanate composition selected from polyisocyanate compositions consisting of hexamethylene diisocyanate, the biuret of hexamethylene diisocyanate (HDI), the trimer of HDI and mixtures and reaction products thereof. Other compounds and polymers having reactive groups that can react with isocyanate functions such as epoxy resins can also comprise part A. The corrosion resistant composition comprising a polymeric matrix resulting, from the reaction of polyisocyanate composition and the polyol contains corrosion inhibiting pigments selected from the group consisting of zinc hydroxy phosphite, zinc phosphate, calcium ion-exchanged silica, calcium strontium zinc phosphosilicate and mixtures thereof and is applied to a substrate metal in one coat without the need of a primer.

DESCRIPTION OF THE PREFERRED EMBODIMENTS

The corrosion resisting coating of the present invention is formed from a two part resin composition comprising a combination of resins containing non-toxic corrosion inhibiting pigments and low levels of volatile organic compounds. The two parts of the coating composition, part A and part B, are mixed prior to application and react to form a strongly adherent solvent resistant polymeric matrix comprising a polyurethane that contains corrosion inhibiting pigments selected from the group consisting of zinc hydroxy phosphite, zinc phosphate, calcium ion-exchanged silica, calcium strontium zinc phosphosilicate and mixtures thereof and is applied to a substrate metal in one coat without the need of a primer. The pot life of the formulation after mixing is about three to about four hours. The first part or part A of the coating composition comprises a saturated polyester polyol comprising a reaction product of phthalic anhydride and trimethylol propane (also known in the art as TMP) having an equivalent weight of about 100 to an equivalent weight of about 2500. Preferably, the saturated polyester polyols comprising part A are characterized by an equivalent weight of about 225 to about 600, an acid number not greater than about 4 and a hydroxyl number of about 104 to about 220. Preferred saturated polyester polyols are selected from compositions that are characterized by an acid number (on solution) of about 0 to about 3, a hydroxyl number (on solution) of about 104 to about 120, with an equivalent weight (on solution) of about 468 to about 539 and an equivalent weight (on solids) of about 374 to about 431 with representative commercially available formulations marketed under the name Chempol® 18-2217 (Freeman Chemical Corporation, Port Washington, Wis.) and Mobay 670A-80 (Bayer, Mobay Corporation, Pittsburgh, Pa.) and compositions that are characterized by an acid number (on solution) of about 1 to about 4, a hydroxyl number (on solution) of about 155 to about, 190, with an equivalent weight (on solution) of about 312 to about 328 and an equivalent weight (on solids) of about 480 with representative commercially available formulations marketed under the name Chempol® 18-2230 (Freeman Chemical Corporation, Port Washington, Wis.) and Desmophen 650A-65 (Bayer, Mobay Corporation, Pittsburgh, Pa.) and compositions that are characterized by a maximum acid number of about 3, a hydroxyl number of about 200 to about 220, with an average equivalent weight of about 267 with a representative commercially available formulation marketed under the name Desmophen 631A-75 (Bayer Corporation, Industrial Chemicals Division, Pittsburgh, Pa.) and other equivalent compositions and formulations and mixtures thereof.

The second part or part B of the coating composition preferably comprises an aliphatic or cycloaliphatic polyisocyanate resin based on hexamethylene diisocyanate (also known in the art as HDI) having an average equivalent weight of about 255. A commercially available formulation comprising such a polyisocyanate based on HDI is Desmodur N-75 (Bayer, Mobay Corporation, Pittsburgh, Pa.), however other equivalent compositions and formulations may also be used. In practice the polyisocyanate comprises a biuret of HDI, but an HDI trimer can also be used. Other polyisocyanates such as those enumerated in U.S. Pat. No. 5,043,373, which is herein incorporated by reference, may also be used to formulate part B of the present composition.

Typical formulations for Part A and Part B of resin matrices for corrosion resistant coating compositions are given in Example 1, Table 1. Standard methods known in the art are used in preparing these resin matrices, for example those described in Hegedus et al, U.S. Pat. No. 4,885,324 which is herein incorporated by reference and the previously incorporated U.S. Pat. No. 5,043,373. Generally, the quantities of polyol and polyisocyanate are preferably adjusted to provide an approximately 1:1 ratio of hydroxyl to isocyanate groups when part A and part B are mixed. However, effective resin matrices can be obtained when the concentration of either of these functional groups in the mixture exceeds the other by about 20%. The following examples demonstrate the overall superior performance of the preferred polymeric matrix compositions which are derived from coating formulation 1 and coating formulation 3 in Example 1.

EXAMPLE 1

This example describes preparation of resin matrices for protective coating formulations useful in aerospace and other industrial applications and preparation for testing.

Parts A and B for each of the formulations delineated in Table 1 were prepared and then mixed using standard procedures known in the art.

TABLE 1

COATING COMPOSITION MATRIX FORMULATIONS

| | EQUIV. WEIGHT. | COATING FORMULATION | | | | | | | |
|---|---|---|---|---|---|---|---|---|---|
| | | 1 | 2 | 3 | 4 | 5 | 6 | 7 | 8 |
| COMPONENT I (SOURCE) | | | | | | | | | |
| Chempol 18-2230 (A) | 312 | 303.9 | | | 153.7 | 54.6 | 376.0 | | 323.7 |
| Chempol 18-2219 (A) | 500 | | | | | 106.2 | 38.5 | | |
| Chempol 18-2217 (A) | 500 | 113.1 | | 110.4 | 272.6 | 272.6 | | | |
| Desmophen 631A75 (B) | 266 | | | 257.0 | | | | 267.7 | |
| Desmophen 1700 (B) | 1275 | | 96.3 | | | | | 91.9 | 96.3 |
| Desmophen 651A65 | 330 | | 323.8 | | | | | | |
| Cellulose Acetate/ Butyrate 381.1 | | 1.1 | 1.1 | 1.1 | 1.1 | 1.1 | 1.1 | 1.1 | 1.1 |
| EEP Solvent (ethyl 3-ethoxyproprionate) | | 258.0 | 280.0 | 298.2 | 288.3 | 301.8 | 241.0 | 283.6 | 280.0 |
| Tin Catalyst/ 10% Solution | | 0.5 | 0.5 | 0.5 | 0.5 | 0.5 | 0.5 | 0.5 | 0.5 |
| COMPONENT II (SOURCE) | | | | | | | | | |
| Desmodur N-75 (A) | 255 | 323.4 | 298.3 | 332.8 | 283.8 | 259.2 | 342.9 | 355.4 | 298.4 |

(A) = Freeman Chemical Corp.
(B) = Mobay Chemical Corp.

The coating compositions of Table 1 were then applied in a single coat to Alodine 1200S treated 2219 aluminum panels and also to Scotch Brite deoxidized 2219 aluminum panels in preparation for adhesion and chemical resistance tests. The coating can be applied to the substrate metal part by spraying, dipping or brushing and is then cured at room or ambient temperatures or can be dried by heating at about 100° F. to about 250° F. for up to about an hour.

EXAMPLE 2

This example describes adhesion testing of the resin portion of the coating formulations prepared in Example 1. ASTM Method D3359, which is herein incorporated by reference, was used to screen the coating formulations 1–8 for adhesion. In this method, the coating on test panels of the substrate metal is cross-cut with lines approximately 1/16th inch apart and then applying tape to the cross-cut zone, removing the tape and examining the scribed area for lifted paint. The coatings were rated according to the ASTM D3359 classification method 0B to 5B where 0B has greater than 65% adhesion loss and 5B has no loss. The results of this test are given in Table 2. It is seen that compositions 2, 7 and 8 had a 5B rating or 100% adhesion. On Alodine 1200S pretreated 2219 aluminum, all compositions in Table 1 had a 5B rating or 100% adhesion.

This example describes flexibility testing of the coating compositions of Table 1. For these tests Alodine 1200S pretreated 3003 0.030 inch thick aluminum panels were coated with the compositions. These panels were bent 180 degrees over a ¼ inch mandrel. The results of this test are given in Table 3. It is seen that compositions 1, 2, 3, 4, 5, 7 and 8 had no signs of cracking while composition 6 showed minimal cracking.

EXAMPLE 4

This example describes testing of the coating compositions of Table 1 for resistance to strong acid and base. For these tests clear films were applied to panels of Alodine 1200S pretreated aluminum at approximately 2 mil dry film thickness and allowed to cure at room temperature (about 72° F.) for 7 days. About ½ ml of each test solution was placed on the coated panels and covered with a watch glass. The effect on the coating was checked after 24 hours and 96 hours. These results are given in Table 4.

TABLE 4

RESISTANCE TO STRONG ACID AND BASE

| COATING FORMULATION NUMBER | HCl (15%) Exposure Time 24 hours | HCl (15%) Exposure Time 96 hours | H$_2$SO$_4$ (15%) Exposure Time 24 hours | H$_2$SO$_4$ (15%) Exposure Time 96 hours | NaOH (31%) Exposure Time 24 hours | NaOH (31%) Exposure Time 96 hours |
|---|---|---|---|---|---|---|
| 1 | No Effect | No Effect | No Effect | No Effect | No Effect | No Effect |
| 2 | No Effect | Softened, easily scratched | No Effect | Softened, easily scratched | No Effect | No Effect |
| 3 | No Effect | No Effect | No Effect | No Effect | No Effect | No Effect |
| 4 | No Effect | No Effect | No Effect | No Effect | No Effect | No Effect |
| 5 | No Effect | No Effect | No Effect | No Effect | No Effect | No Effect |
| 6 | No Effect | No Effect | No Effect | No Effect | No Effect | No Effect |
| 7 | No Effect | Blistered, softened, easily scratched | No Effect | Blistered, softened, easily scratched | No Effect | Light stain not softened |
| 8 | No Effect | Softened, easily scratched | No Effect | Softened, easily scratched | No Effect | Very light stain, not softened |

EXAMPLE 5

This example describes testing of the coating compositions of Table 1 for resistance to solvents. Panels prepared as in Example 4 were rubbed 50 times (100 passes) and 100 times (200 passes) with a cotton rag soaked in methylethylketone (MEK) using firm finger pressure. The coating was then examined. The same test was performed using methylene chloride. These results are given in Table 5.

TABLE 5

RESISTANCE TO SOLVENTS

| COATING FORMULATION NUMBER | MEK Number of Passes 100 | MEK Number of Passes 200 | CH$_2$Cl$_2$ Number of Passes 100 | CH$_2$Cl$_2$ Number of Passes 200 |
|---|---|---|---|---|
| 1 | No Effect | No Effect | Very slightly softened, hard to scratch | Slight additional softening |
| 2 | No Effect | Very slightly softened, hard to scratch | Very soft, very easy to scratch | — |
| 3 | No Effect | No Effect | Very slightly softened, hard to scratch | Slight additional softening |
| 4 | Very soft, easy to scratch | — | Softened, can be scratched | Very soft, easily scratched |
| 5 | Very soft, easy to scratch | — | Very soft, very easy to scratch | — |
| 6 | No Effect | No Effect | Very slightly softened, hard to scratch | Very slightly softened, hard to scratch |
| 7 | No Effect | Very slightly softened, hard to scratch | Very soft, very easy to scratch | — |
| 8 | No Effect | No Effect | Very slightly softened, hard to scratch | Slight additional softening |

EXAMPLE 6

This example describes formulation of a corrosion resistant coating composition containing non-toxic corrosion resistant pigments.

The test results for Examples 2–5 are summarized and ranked in Table 6A. It can be seen that only formulations 1, 3 and 6 had good resistance to CH$_2$Cl$_2$, MEK, NaOH, H$_2$SO$_4$ and HCl and of these, only formulations 1 and 3 had good flexibility. On this basis, it can be seen that the preferred coating matrix compositions, designated 1 and 3 in Table 1 give the best balance of results, making them superior for use in aerospace and other industrial applications.

TABLE 6A

PERFORMANCE OF COATING COMPOSITIONS

| | ADHESION TO DEOXIDIZED 2219 ALUMINUM | ADHESION TO ALODINE 1200S PRETREAT 2219 ALUMINUM | FLEXI-BILITY | RESISTANCE TO | | | | |
|---|---|---|---|---|---|---|---|---|
| | | | | 15% HCl | 15% $H_2SO_4$ | 31% NaOH | MEK | $CH_2Cl_2$ |
| BEST | 2, 7, 8 | 1–8 | 1–5, 7–8 | 1, 3, 4, 5, 6 | 1, 3, 4, 5, 6 | 1, 2, 3, 4, 5, 6 | 1, 3, 6, 8 | 6 |
| 2nd | 3 | | 6 | | | 7 | 2, 7 | 1, 3, 8 |
| 3rd | 1 | | | | | 8 | | |
| 4th | 4, 5 | | | 2, 8 | 2, 8 | | | 4 |
| WORST | 6 | | | 7 | 7 | | 4, 5 | 2, 5, 7 |

The formulations given in Table 6B were prepared from coating compositions 1 and 3 of Table 1 using the pigments indicated in Table 6B. The formulation designated EK11 is a control combination primer-topcoat coating formulation based on the disclosures of Hegedus, et al in the previously incorporated U.S. Pat. Nos. 4,885,324 and 5,043,373 having the following composition:

Control formulation EK11 had a pigment to volume concentration (PVC) of 8.66, a pigment to binder ratio of 0.35, a weight of solids of 66.8% and a volume of solids of 56.5%.

The pigmented formulations or paints of Table 6B are typically made by adding the corrosion inhibiting pigments and other solids to Part A, comprising the polyol, of the two part formulation. The components are then mixed prior to use. Pot life of the mixture may be extended by reducing the level of the catalyst from about 0.05 weight % of the total matrix formulation to about 0.01%. In contrast to this, the pot life of the pigmented formulations of Table 6B was dramatically reduced by adding zinc salts of benzoic acid as disclosed by Hegedus, et al. The pot life of formulations containing zinc salts of benzoic acid was reduced to as little as about 45 minutes in some cases, but usually to about one third to one half of the pot life of the formulation not containing zinc benzoate salts. Such catalysts are known in the art and are generally comprised of tin salts and the like. As is known in the art, moisture scavengers are incorporated in the formulation to prevent destruction of reactive isocyanate functionality. Any moisture scavenger may be employed providing it does not interfere with the chemical interaction of the components or the ultimate performance of the coating. Typically, from about 0.1% to about 0.5%, based on the total weight of the formulation including solvent (or about 0.15% to about 0.7% based on dry coating weight), of a moisture scavenger may be used with about 0.3% preferred. A preferred type of moisture scavenger are the materials known commercially as "Molecular Sieves," used in the form of a finely divided powder having an average particle size of about 4 Å.

Preferred versions of the coating formulations of the present invention contain about 1% to about 3%, based on the total weight of the formulation including solvent (or about 1% to about 5%, 1.4% to about 4.2% based on dry coating weight), of wet ground mica as an extender that improves corrosion resistance. However, a high level of salt spray corrosion resistance is achieved even in the absence of wet ground mica. In practice, as is known in the art, the coatings of the present invention may also contain about 10% to about 15%, based on the total weight of the formulation including solvent (or about 14% to about 21% based on dry coating weight), of titanium dioxide pigment with about 12% to about 13% preferred. In practice, as is known in the art, the formulation may in addition also contain about 13% to about 17% based on the total weight of the formulation including solvent (or about 18% to about 21% based on dry coating weight), of calcium carbonate with about 14% to about 16% preferred, as well as about 0.2% to about 0.6% of a flow additive based on the total weight of the formulation including solvent (or about 0.3% to about 0.8% based on dry coating weight) with about 0.3 to about 0.5% preferred. A commercially available flow additive such as BIJCK 306 is preferred.

Any solvent known in the art in which the components of the coating formulation may be dissolved or dispersed may be used. Solvents comprising environmentally acceptable solvents such as ethyl 3-ethoxyproprionate (EEP) are preferred, however, other solvents and mixtures of solvents may be used providing they do not interfere with the reaction of the isocyanate component with the polyol component and the ultimate formation of a cohesive, adherent coating on the substrate metallic surface. Generally, the amount of solvent in the formulation is the total weight of all the solvents including solvents present in commercially supplied components. Generally, commercial available polyol resins contain about 25% to about 35% by weight of propyleneglycol methylether acetate known in the art as PMA or PM acetate. Commerically available polyisocyanante resins generally contain about 20% to about 30% by weight of a mixed solvent comprising an approximately 1:1 weight ratio of xylene and n-butyl acetate. The total weight of the solvent in the formulation of the present invention may range from about 20% to about 50%. However, solvent weights in the formulation of about 20% to about 28% are preferred with about 22% to about 26% most preferred in order to reduce potential environmental hazards while retaining good handling properties. In practice, the volumes of the components are adjusted so that part A, the polyol component containing the pigments, has about twice the volume of part B the isocyanate containing component.

In practice, the corrosion resistant formulations of the present invention have a pigment volume concentration (PVC) of about 28% to about 38% with PVC's of about 31% to about 35% preferred. The corrosion resistant formulations of the present invention have corrosion resisting pigment to polymeric binder ratios of about 1:1.5 to about 1:3.5 with ratios of about 1:2 to about 1:3 preferred. The corrosion resistant coating formulations of the present invention generally have a preferred weight of solids including polymeric binder of about 72% to about 80% with a weight of solids of about 74% to about 78% most preferred. Generally the polymeric binder comprises about 28% to about 60% by weight of the total coating formulation including solvent with about 39% to about 49% preferred. The corrosion resisting pigments, selected from the group consisting of zinc hydroxy phoshate, calcium strontium zinc phosphosilicate calcium ion exchanged silica, and barium metaborate, generally comprise about 9% to about 41% of the dry weight of the corrosion resisting coating compositions of the present invention with about 12% to about 33% preferred and about 14% to about 24% most preferred. However, higher and lower levels of corrosion resisting pigment may still be effective in preventing corrosion depending on the severity of the conditions and length of exposure. Mixtures comprising two or more of the corrosion resisting pigments in which the total weight of the pigment mixture comprises about 9% to about 41% of the dry coating weight may also be used. The volume of solids of the preferred formulation may range from about 57% to about 66% with a volume of solids of about 59% to about 63% most preferred.

tium zinc phosphosilicate gave superior results in corrosion tests compared to the other pigments tested.

EXAMPLE 7

This example describes salt fog corrosion tests on the corrosion resistant coating compositions prepared in Example 6. The coatings prepared in Example 6 were applied by air atomizing spray gun to both Alodine 1200S pretreated 2219 aluminum panels and deoxidized 2219 aluminum panels. Two 3 inch by 5 inch panels pretreated with Alodine 1200S and one 3 inch by 5 inch panel of deoxidized aluminum were coated with each formulation. The coatings were applied at approximately 3 mil dry film thickness and then cured for 7 days at room temperature. The coatings were then scribed with an "X" and placed in an ASTM B117 Salt Fog Test using 5% salt solution. The results of these tests are presented in Table 7.

With the exception of formulation EK6, which gave somewhat superior performance, all of the formulations gave about the same result on deoxidized aluminum. The alodine panels were stripped and the tests were repeated with essentially the same results. These results are summarized in Table 7A.

As is seen in Table 7A all pigment, binder formulations with the exception of EK2 and EK8 were superior to control

TABLE 6B

CORROSION RESISTANT COATING COMPOSITION FORMULATIONS

| | | COATING FORMULATION | | | | | | | | |
|---|---|---|---|---|---|---|---|---|---|---|
| | | EK 1 | EK 2 | EK 3 | EK 4 | EK 5 | EK 6 | EK 8 | EK 9 | EK 10 |
| RESIN COMPONENT (Coating Composition # Table 1) | | 1 | 1 | 1 | 1 | 3 | 3 | 3 | 3 | 3 |
| PIGMENT COMPONENT (SOURCE) | PIGMENT COMPOSITION | QUANTITY OF PIGMENT AS % OF DRY SOLIDS | | | | | | | | |
| Nalzin #2 (A) | Zinc Hydroxy Phosphite | 27.8 | | | | 27.8 | | | | |
| Halox SZP-391 (B) | Calcium Strontium Zinc Phosphosilicate | | 27.8 | | | | 27.8 | | | |
| Phosguard JO855 (C) | Zinc Phosphate | | | 27.8 | | | | | | |
| Shieldex (D) | Calcium Ion-Exchanged Silica: Amorphous Silica (94% wt. d.b.) Calcium content (6% wt. d.b.) | | | | 19.85 | | | | | |
| Busan 11-M1 (E) | Barium Metaborate Monohydrate | | | | | | | 27.8 | | |
| Molywhite 101 (F) | ZnMoO$_4$ (25% wt.) ZnO (75% wt) | | | | | | | | 27.8 | |
| Molywhite 151 (F) | Zinc Molybdate | | | | | | | | | 27.8 |
| Zinc Phosphate (G) | | | | | | | | | | |
| Sicorin RZ (H) | | | | | | | | | | |
| Molywhite 101 | | | | | | | | | | |

As can be seen from the following examples, the corrosion resisting coating composition of the present invention comprising a resin matrix, with the resin matrix formed from the reaction product of a polyisocyanate based on hexamethylene diIsocyanate with a polyester polyol comprising the reaction product of phthalic anhydride and trimethylol propane, containing corrosion inhibiting pigments selected from the group consisting of zinc hydroxy phosphite, zinc phosphate, calcium ion-exchanged silica and calcium strontium zinc phosphosilicate gave superior results in corrosion formulation EK11 and the formulations of the present invention EK1, EK3, EK4 and EK6 were superior in corrosion resistance performance compared to all the other formulations tested. It was also observed that a version of the EK6 formulation prepared without the corrosion resisting pigment component gave results equal to control formulation EK11 when subjected to the above test, indicating that the polymeric matrix itself presents a considerable barrier against the corrosive effects of salt spray.

In another series of tests the EK6 version of the coating formulation of the present invention was applied to panels made of the following non-corrosion resistant, high strength, low alloy steels: AISI 4130, 4340 and D6AC. The coatings were then scribed with an "X" in accord with the procedure of ASTM B117 and exposed on an ocean beach for five years. After this period of exposure there was no undercutting or blistering in the area of the "X". Red rust was observed in the "X" but it did not propagate away from the "X" under the coating. These results demonstrate the superior corrosion resistance of an embodiment of the present invention on steel as well as aluminum.

EXAMPLE 8

This example describes flatwise tensile tests to quantitatively determine coating adhesion using ASTM procedure D897, which is herein incorporated by reference. This procedure was modified by use of a 1"×1" anvil to determine force per square inch required to separate a coating from a substrate metallic surface. Substrate metals were coated with corrosion resistant formulations EK1 and EK6 and the surface of the 1"×1" metallic anvil was adhesively bound to the coating with cyanoacrylate. The apparatus was mounted in a standard tensile testing device and the force required to separate the corrosion resistant coating from the metallic surface was measured. These results are given in Table 8A.

As can be seen from the results of Table 8A, the adhesive strength of the tested coatings far exceeds the minimum acceptable values for use of these coatings in aerospace functions such as protective coatings for booster rockets.

In another series of flatwise tensile tests alodined aluminum was coated with EK1 corrosion resistant formulation and a thermal protection coating known in the aerospace arts was then applied over the EK1 layer. The 1"×1" anvil was then adhesively bonded to the thermal protection layer with cyanoacrylate and the force required to separate the thermal protection layer from the EK1 coating was measured. These results are given in Table 8B.

As can be seen from Table 8B the adhesive strength of both of the thermal protective coatings to the EK1 version of the corrosion resistant coating layer of the present invention far exceeded the minimum acceptable values for use in aerospace functions. This further establishes the utility of the coatings of the present invention for aerospace functions by showing that thermal protective layers known to be useful in the art will adhere to them at levels far exceeding the minimum level accepted in the art and can thus be protected by these coatings. In general, the coatings of the present invention may be used to protect porous polymeric composite materials, as well as metallic surfaces from deterioration promoted by water and water borne agents.

The coatings of the present invention may be applied by any means known in the art. Thinner, lower viscosity versions may be sprayed while thicker more viscous versions needed for thicker layers may be rolled on.

From the foregoing, it is clear that the corrosion resistant coatings of the present invention are effective in protecting metallic surfaces from corrosion under the severe conditions, such as exposure to salt spray, commonly encountered by booster rockets and other aerospace equipment as well as other heavy industrial machinery. The coatings of the present invention achieve a high level of corrosion protection without the need of a primer coating or the use of heavy metal components or high levels of volatile organic compounds that may be toxic to the environment and the personnel exposed to them. In addition, it affords substantial savings in labor, due to the need for only one coat. A further advantage of the corrosion resistant coatings of the present invention is their ability to protect the substrate metal from corrosion at a thickness of only about 3 mil to about 4 mil compared to thickness of about 8 mil to about 12 mil required for multicoat coat primer based systems used in the art. The thinner coating required by the coatings of the present invention for effective corrosion protection thereby provide substantial savings in aerospace applications where weight is a key factor.

A still further advantage of the corrosion resisting coating formulation of the present invention, particularly when used on high altitude rockets, is the ability of thermal insulation coatings currently used in the art of high altitude rocketry to adhere to them and for the coatings of the present invention to adhere to such thermal insulation coatings. The skin of such rockets may be protected against corrosion by application of a single coat of a version of the corrosion resistant coating of the present invention, and then covering the anti-corrosion coating with a thermal insulation layer. As the thermal insulation layer is porous and may be harmed by the incursion of seawater before the rocket is recovered from the ocean after use, the thermal protective coating may itself be protected from such incursion by creating a low permeability barrier by coating it with about a single 3 mil to about an 8 mil layer of the corrosion resistant formulation of the present invention having the appropriate viscosity, instead of the approximately 20 to 25 mil layer of elastomeric moisture proof barrier in current use, thereby producing substantial weight savings, and savings in labor. There is also a significant savings in time, hazardous waste disposal costs and human protection costs by using the coating formulations of the present invention.

The coatings of the present invention may be used for corrosion protection in other applications outside of the field of aerospace. For example, they may be used to protect components of machinery, ground support equipment, automatic machinery, machinery used in energy related fields, components of ships and related equipment, metallic fasteners of all kinds and any other component that is exposed to the corrosive effects of salt spray and where there is at need to avoid toxic heavy metals for human safety and environmental protection. The high level of solvent resistance of the coatings of the present invention also makes them useful in protecting surfaces where graffiti is a problem. Solvents may be used to remove the graffiti without damaging the protective corrosion resistant coating.

The corrosion resisting coating formulation of the present invention comprises a polymeric binder having a combination of exceptional adhesion to metallic surfaces with a high degree of flexibility combined with excellant solvent and acid-base resistance. In contrast to prior art corrosion resistant coatings, such as those disclosed by Hegedus et al in U.S. Pat. No. 5,403,880. That contain a combination of three corrosion resisting pigments to achieve their corrosion resisting pigment comprised of a paigment selected from the group consisting of zinc hydroxy phosphite, zinc phosphate, cvalcium strontium zinc phosphosilicate and calcium ion exchanged silica to achieve superior corrosion resistance. In addition to providing superior corrosion resistance, the use of a single corrosion resisting pigment in the coating composition of the present invention facilitates manufacture and reduces costs.

Although the present invention has been described in considerable detail with reference to certain preferred versions thereof, other versions are possible. Therefore, the spirit and scope of the appended claims should not be limited to the description of the preferred versions contained herein.

What is claimed is:

1. A composition to protect metallic and polymeric composite surfaces from corrosion and water promoted deterioration comprising:
   a polymeric matrix, the polymeric matrix comprising the reaction product of;
      a polyisocyanate selected from the group consisting of hexamethylene diisocyanate, a biuret of hexamethylene diisocyanate, a trimer of hexamethylene diisocyanate and mixtures and reaction products thereof; with a saturated polyester polyol, the saturated polyester polyol comprising at least one reaction product of phthalic anhydride and trimethylol propane;
   and a single corrosion inhibiting pigment selected from the group consisting of zinc hydroxy phosphite, zinc phosphate, calcium strontium zinc phosphosilicate and mixtures thereof, where substantially 9% to 41% by weight of said corrosion inhibiting pigment is added to substantially 28% to 60% by weight of the polymeric matrix.

2. The composition of claim 1 in which the saturated polyester polyol has an equivalent weight of about 100 to about 2500.

3. The composition of claim 2 in which the saturated polyester polyol has an equivalent weight of about 225 to about 600, an acid number not greater than about 4 and a hydroxyl number of about 104 to about 220.

4. The composition of claim 3 in which the polyisocyanate has an average equivalent weight of about 255.

5. The composition of claim 4 further comprising additives selected from the group consisting of 1.4% to 4.2% by weight of mica, 14% to 21% by weight of titanium dioxide, and 18% to 21% by weight of calcium carbonate.

6. The composition of claim 5 in which the corrosion inhibiting pigment comprises about 12% to about 25% of the dry coating weight.

7. The composition of claim 6 containing about 14% to about 21% titanium oxide and about 18% to about 21% calcium carbonate and about 1.4 to about 4.2% mica.

8. The composition of claim 7 in which the saturated polyester polyol is selected from the group consisting of; polyester polyols having an equivalent weight on solution of about 468 to about 539 and an equivalent weight on solids of about 374 to about 431 and with an acid number of about 0 to about 3 and a hydroxyl number of about 104 to about 120, polyester polyols having an equivalent weight on solution of about 312 to about 328 and an equivalent weight on solids of about 480 with an acid number on solution of about 1 to about 4 and a hydroxyl number on solution of about 155 to about 190, polyester polyols having an average equivalent weight of about 267 and with a maximum acid number of about 3 and a hydroxyl number of about 200 to about 220, and mixtures thereof.

9. A paint to protect metallic or polymeric composite surfaces from corrosion and water promoted deterioration prepared by forming a mixture comprising:
   a polyisocyanate selected from the group consisting of;
      hexamethylene diisocyanate, a biuret of hexamethylene diisocyanate, a trimer of hexamethylene diisocyanate and mixtures and reaction products thereof, and
   a saturated polyester polyol selected from the group consisting of;
      polyester polyols having an equivalent weight on solution of about 468 to about 539 and an equivalent weight on solids of about 374 to about 431 and with an acid number of about 0 to about 3 and a hydroxyl number of about 104 to about 120, polyester polyols having an equivalent weight on solution of about 312 to about 328 and an equivalent weight on solids of about 480 with an acid number on solution of about 1 to about 4 and a hydroxyl number on solution of about 155 to about 190, polyester polyols having an average equivalent weight of about 267 and with a maximum acid number of about 3 and a hydroxyl number of about 200 to about 220, and mixtures thereof, and
   a corrosion inhibiting pigment selected from the group consisting of;
      zinc hydroxy phosphite, zinc phosphate, calcium ion-exchanged silica, calcium strontium zinc phosphosilicate and mixtures thereof,
   a catalyst to catalyze polyurethane formation, and an organic solvent.

10. The paint of claim 9 in which the mixture further comprises additives selected from the group consisting of mica in the range of substantially 1.4% to 4.2% by weight, titanium dioxide in the range of substantially 10% to 15% by weight and calcium carbonate in the range of substantially 13% to 17% by weight.

11. The paint of claim 10 in which the polyisocyanate has an average equivalent weight of about 255.

12. The paint of claim 11 comprising about 12% to about 25% by weight of corrosion inhibiting pigment, about 14% to about 21% by weight of titanium dioxide, about 18% to about 21% by weight of calcium carbonate and about 1.4% to about 4.2% by weight of mica based on the weight of the mixture without solvent.

13. The paint of claim 12 in which the mixture contains about 0.01% to about 0.05% by weight of the catalyst based on the total weight of the polyol and the polyisocyanate and the catalyst comprises a tin salt.

14. A method of protecting metallic or polymeric composite surfaces from corrosion and water promoted deterioration comprising the steps of:
   a) forming a mixture in an organic solvent comprising;
      a polyisocyanate having an equivalent weight of about 255 selected from the group consisting of;
         hexamethylene diisocyanate, a biuret of hexamethylene diisocyanate, a trimer of hexamethylene diisocyanate and mixtures and reaction products thereof, and
      a saturated polyester polyol selected from the group consisting of;
         polyester polyols having an equivalent weight on solution of about 468 to about 539 and an equivalent weight on solids of about 374 to about 431 and with an acid number of about 0 to about 3 and a hydroxyl number of about 104 to about 120, polyester polyols having an equivalent weight on solution of about 312 to about 328 and an equivalent weight on solids of about 480 with an acid member on solution of about 1 to about 4 and a hydroxyl number on solution of about 155 to about 190, polyester polyols having an average equivalent weight of about 267 and with a maximum acid number of about 3 and a hydroxyl number of about 200 to about 220, and mixtures thereof, and
      a pigment that inhibits corrosion selected from the group consisting of zinc hydroxy phosphite, zinc phosphate, calcium ion-exchanged silica, calcium strontium zinc phosphosilicate and mixtures thereof, and a catalyst to catalyze polyurethane formation;

b) coating a surface with the mixture;

c) curing the mixture.

15. The method of claim 14 in which the mixture further comprises additives selected from the group consisting of mica, titanium dioxide and calcium carbonate.

16. The method of claim 15 in which the mixture comprises about 12% to about 25% by weight of corrosion inhibiting pigment, about 14% to about 21% by weight of titanium dioxide, about 18% to about 21% by weight of calcium carbonate and about 1.4% to about 4.2% by weight of mica based on the weight of the mixture without solvent.

17. The method of claim 16 in which the mixture contains about 0.01% to about 0.05% by weight of the catalyst based on the total weight of the polyol and the polyisocyanate and the catalyst comprises a tin salt.

18. The method of claim 17 in which the mixture is cured at about 72° F. for about 7 days to about 250° F. for about 1 hour.

* * * * *